(12) United States Patent
Knebel et al.

(10) Patent No.: US 7,492,511 B2
(45) Date of Patent: Feb. 17, 2009

(54) SCANNING MICROSCOPE

(75) Inventors: Werner Knebel, Kronau (DE); Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 131 days.

(21) Appl. No.: 11/572,514

(22) PCT Filed: Jul. 20, 2005

(86) PCT No.: PCT/EP2005/053505

§ 371 (c)(1),
(2), (4) Date: Jan. 23, 2007

(87) PCT Pub. No.: WO2006/008304

PCT Pub. Date: Jan. 26, 2006

(65) Prior Publication Data

US 2007/0223076 A1    Sep. 27, 2007

(30) Foreign Application Priority Data

Jul. 21, 2004   (DE) .................... 10 2004 035 340

(51) Int. Cl.
*G02B 21/00* (2006.01)
*G02B 27/40* (2006.01)

(52) U.S. Cl. .................... 359/368; 359/384; 359/385; 250/201.3

(58) Field of Classification Search ......... 359/368–390, 359/618, 627–630
See application file for complete search history.

(56) References Cited

U.S. PATENT DOCUMENTS

| 5,049,740 A * | 9/1991 | Pines et al. .................. 250/235 |
| 6,677,566 B2 * | 1/2004 | Knebel et al. ............ 250/201.3 |
| 2003/0095329 A1 | 5/2003 | Engelhardt |
| 2004/0036872 A1 | 2/2004 | Engelhardt |

FOREIGN PATENT DOCUMENTS

| DE | 202 16 583 U1 | 1/2003 |
| DE | 102 51 151 A1 | 5/2004 |
| JP | 2006-3394 | * 1/2006 ................. 359/385 |

* cited by examiner

*Primary Examiner*—Thong Nguyen
(74) *Attorney, Agent, or Firm*—Houston Eliseeva LLP

(57) ABSTRACT

The invention relates to a scanning microscope comprising a beam deflecting device (11), which directs an illuminating light beam (5) over or through a sample (21), and comprising a detector (33) for receiving detection light (23) exiting the sample. The scanning microscope comprises an extracting port (67) or another detector (37) and comprises a redirecting device (27), which is synchronized with the beam deflecting device and which directs the detection light according to the deflecting position of the beam deflecting device either to the detector or to the extracting port or to the other detector.

19 Claims, 5 Drawing Sheets

SCANNING MICROSCOPE

RELATED APPLICATIONS

This application is a national stage filing under 35 U.S.C. 371 of PCT application serial number PCT/EP2005/053505 filed on Jul. 20, 2005, which in turn claims priority to German application serial number 10 2004 035 340.9 filed on Jul. 21, 2004, both of which are incorporated herein by reference in their entirety.

BACKGROUND OF THE INVENTION

The invention relates to a scanning microscope with a beam deflector that directs an illumination light beam over or through a sample, and with a detector for receiving detection light exiting from the sample.

In scanning microscopy, a sample is illuminated with a light beam in order to observe the reflection or fluorescent light emitted by the sample. The focus of an illumination light beam is moved in an object plane with the help of a controllable beam deflector, generally by tipping two mirrors in an object plane, whereby the axes of deflection are usually positioned perpendicular to each other, so that one mirror deflects in the x-direction and the other in the y-direction. The mirrors are tipped with the help, for example, of galvanometric positioners. The power of the light coming from the object is measured dependent on the position of the scanning beam. Generally, the positioners are provided with sensors to determine the actual position of the mirrors.

In confocal scanning microscopy in particular, an object is scanned in three dimensions with the focus of a light beam.

A confocal scanning microscope generally comprises a light source, a focusing optic with which the light from the source is focused on a pinhole aperture—the so-called excitation aperture—, a beam splitter, a beam deflector to control the beam, a microscope optic, a detection aperture, and detectors to detect the detection or fluorescent light. The illumination light is coupled via a beam splitter. The fluorescent or reflection light coming from the object returns to the beam splitter via the beam deflector, passes through it, and finally focuses on the detection aperture, behind which are the detectors. Detection light that does not originate directly from the focal region takes another light path and does not pass through the detection aperture, so that pixel information is obtained that leads to a three-dimensional image as a result of sequential scanning of the object. In most cases, a three-dimensional image is achieved by layered data imaging, whereby the path of the scanning light beam ideally describes a meander pattern on or in the object (scanning a line in the x-direction at a constant y-position, then interrupting x-scanning and y-repositioning to the next line to be scanned, and then scanning this line at a constant y-position in negative x-direction, etc.). To enable layered data imaging, the sample table or the objective is repositioned after scanning a layer so that the next layer to be scanned is brought into the focal plane of the objective.

A microscope with a light source that emits light for illuminating a sample and with a spectrometer that receives the detection light exiting from the sample is known from DE 202 16 583 U1. The microscope has an optical arrangement with an acousto-optical component that directs the light from the light source to the sample, and directs the spectrally un-split detection light exiting from the sample to the spectrometer.

SUMMARY OF THE INVENTION

An object of the present invention is to disclose a scanning microscope with universal detectability in order to obtain as much different information as possible during imaging.

This object is solved by a scanning microscope wherein the scanning microscope has an outcoupling port or a further detector, and wherein a deflector is provided that is synchronized with the beam deflector and directs the detection light either to the detector or to the outcoupling port or to the further detector, depending on the deflecting position of the beam deflector.

An advantage of the present invention is that it is possible during imaging to shift in a targeted manner between detectors of varying design.

In a particularly preferred embodiment, a further detector is couplable to the outcoupling port. The further detector may, for example, be a single detector or a spectrometer. The further detector may also be implemented as a multiband detector.

In a particular embodiment of the scanning microscope according to the invention, the deflector has an acousto-optical component. Preferably, the deflector is rotatably or swivelably implemented. In a particularly preferred embodiment, the deflector has a mirror that is preferably implemented as a segment mirror.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention.

The subject of the invention is schematically represented in the drawings and is described below based on the drawings, whereby components that function in the same manner are given the same reference numbers. They show.

DETAILED DESCRIPTION OF THE PREFERRED EMBODIMENTS

Figure 1:
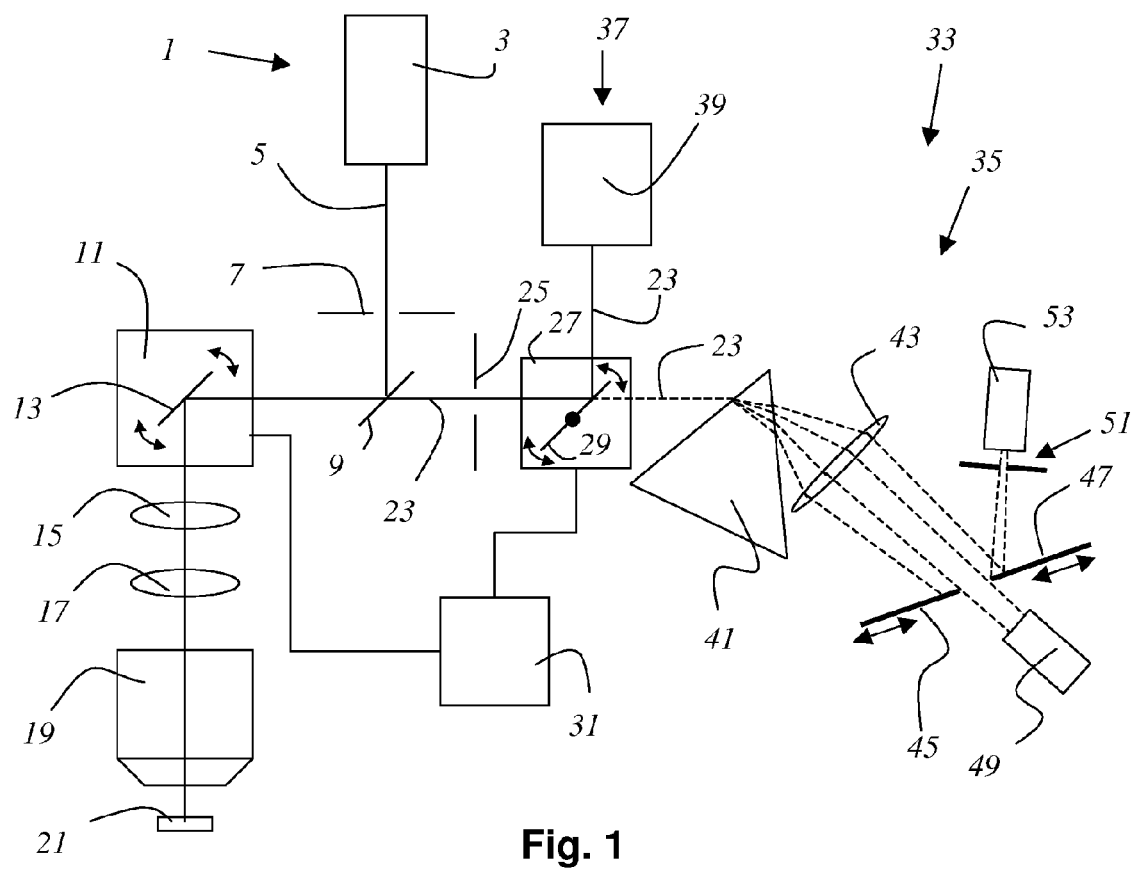
FIG. 1 a scanning microscope according to the invention.

FIG. 1 shows a scanning microscope according to the invention with a light source 1, which is implemented as a multilinear laser 3. The multilinear laser 3 emits an illumination light beam 5 comprising a plurality of light wavelengths. After passing through an illumination light aperture 7, the illumination light beam 5 reaches a main beam splitter 9, which directs the illumination light beam 5 to a beam deflector 11. The beam deflector 11 comprises a cardanically suspended scanning mirror 13, which directs the illumination light beam 5 through a scanning optic 15, a tube optic 17, as well as through a microscope objective 19 and over or through a sample 21. A detection light 23 that exits the sample 21 takes the same light path, namely through the microscope objective 19, the tube optic 17 as well as the scanning optic 15, and reaches the beam deflector 11 and the main beam splitter 9, passes through it and a subsequent detection pinhole aperture 25 and finally reaches a redirecting device 27. The redirecting device 27 comprises a swivel mirror 29, which is driven by a galvanometer that is not shown, a swivel axis of which lies aside from an optical axis of the detection light 23. The redirecting device 27 is synchronized with the beam deflector 11 via an electronic synchronization unit 31 such that the detection light is directed, depending on the deflecting position of the beam deflector 11, either to a detector 33, which is implemented as a multiband detector 35, or to a further detector 37, which in this embodiment is implemented as a spectrometer. In order to direct the detection light 23 to the further detector 37, a galvanometer, which is not shown, rotates the swivel mirror 29 in the beam path of the detection light 23. In order to enable the detection light 23 to reach the multiband detector 35, the swivel mirror 29 is rotated out of the beam path of the detection light 23. FIG. 1 illustrates the position in which the detection light 23 is being directed to the spectrometer 39. During the times in which the swivel mirror 29 is rotated out of the beam path of the detection light 23, the detection light is transmitted as indicated by the dashed lines. The multiband detector 35 comprises a prism 41, which spatially spreads out the detection light 23 spectrally. The spatially spectrally spread out detection light 23 is focused via a lens element 43 into a focus line in which are arranged a first mirror slider 45 and a second mirror slider 47. The spectral portion that is transmitted by the mirror sliders 45, 47 is detected by a first photomultiplier 49. The portion of the detection light 23 that is reflected by the second mirror slider 47 reaches a second photomultiplier 53 after passing through a further aperture arrangement 51. By adjusting the mirror sliders 45, 47, one can adjust which spectral portions of the detection light 23 reach the first photomultiplier 49 or the second photomultiplier 53. The arrangement of the multiband detector 35 can comprise further mirror sliders and detectors, and may accordingly be further cascaded. For a better overview, two further detection channels have been illustrated here.

Figure 2:
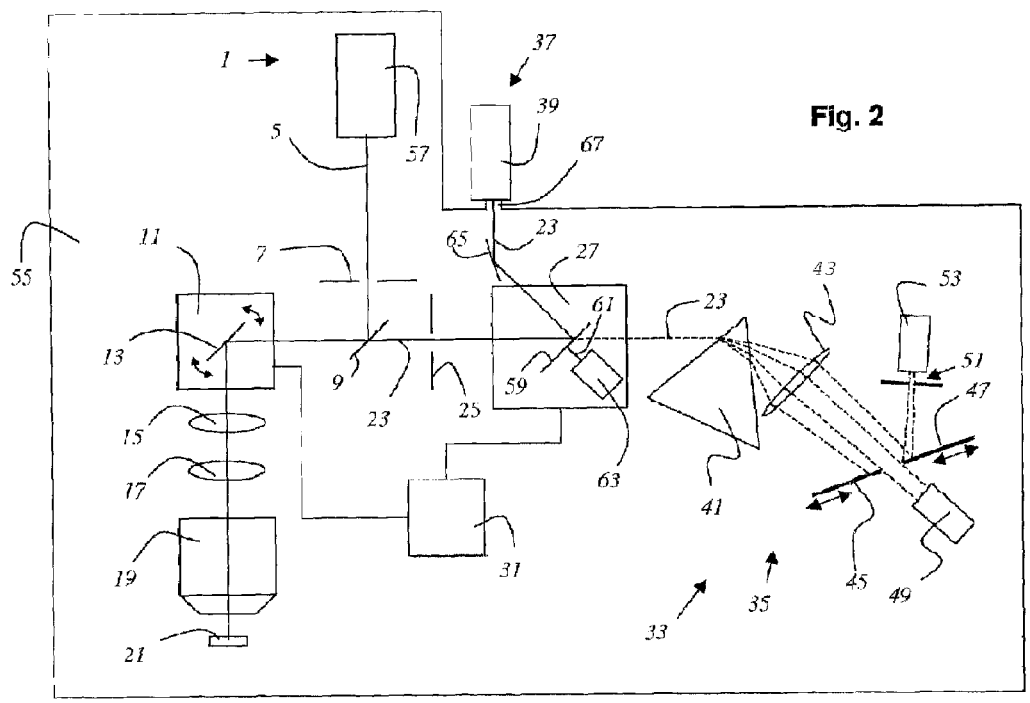
FIG. 2 a further scanning microscope according to the invention.

FIG. 2 shows a further scanning microscope 55 according to the invention with a light source 1, which is implemented as a multilinear light source 57. The multilinear light source 57 emits an illumination light beam 5, comprising a plurality of illumination light wavelengths which, analogous to the scanning microscope illustrated in FIG. 1, is directed over or through a sample. The scanning microscope represented in FIG. 2 has a redirecting device 27 with a chopper plate 59, which is rotated via a rotating shaft 61 by a motor 63. The chopper plate 59 in this FIGURES has a pie-chart-like segmentation, which is not shown, such that, depending on which segment happens at the moment to be rotated into the beam path of a detection light 23, the detection light is directed, depending on the deflecting position of a beam deflector 11, either to a detector 33, which is implemented as a multiband detector 35, or via a deflection mirror 65 to an outcoupling port 67. A further detector 37, which is implemented as a spectrometer 39, is coupled to an outcoupling port 67.

Figure 3:
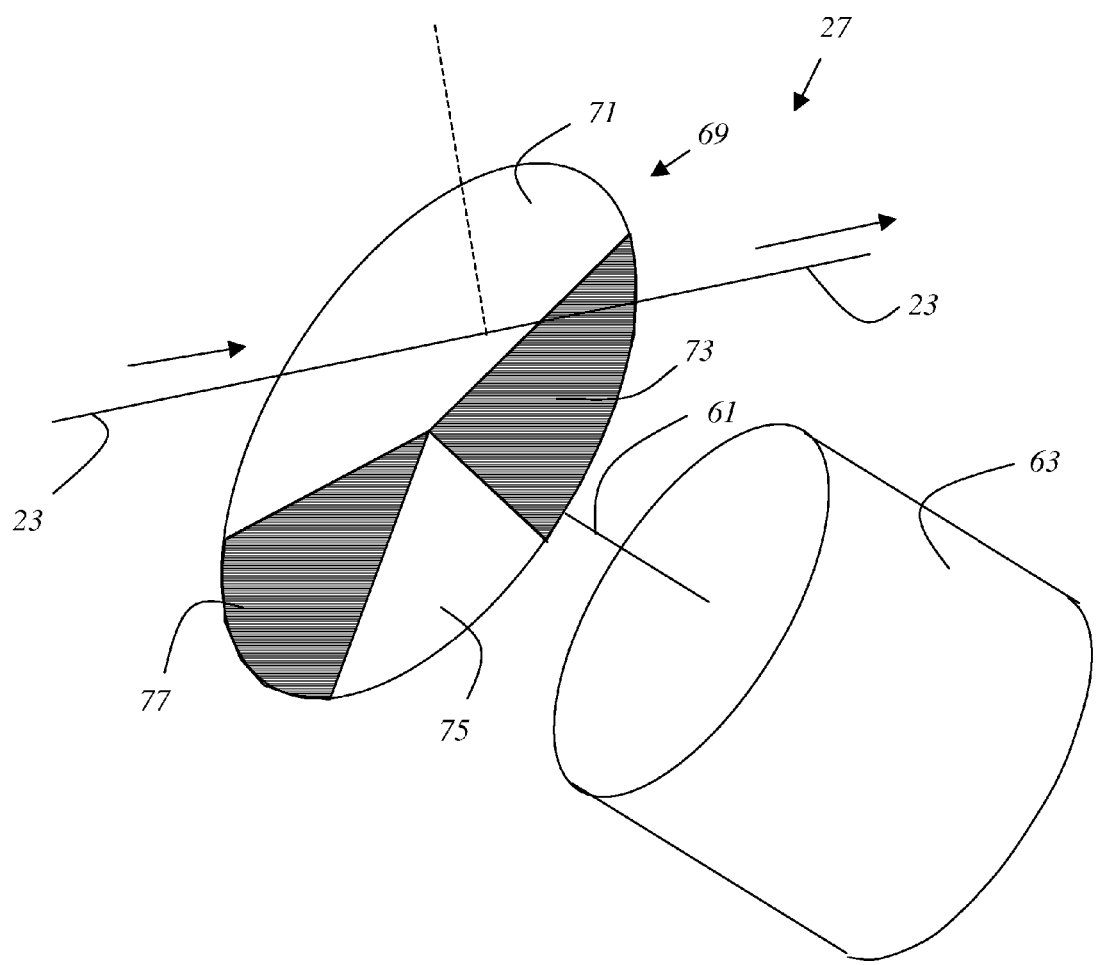
FIG. 3 a detailed representation of a deflector.
Figure 4:
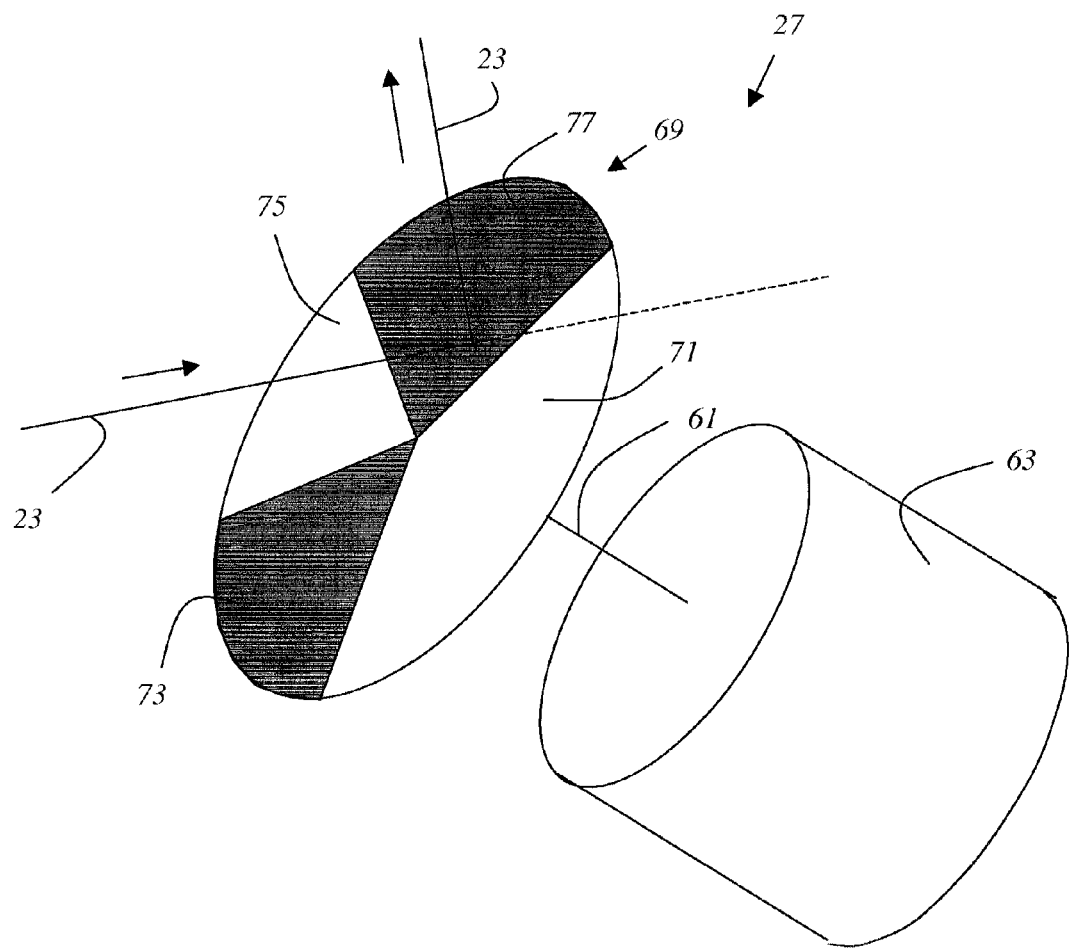
FIG. 4 a detailed representation of a further detector.

FIG. 3 shows a redirecting device 27, which is comprised of a segmentally coated pie-chart-like substrate 69, which is rotated via a rotating shaft 61 by a motor 63. The substrate 69 has a first segment 71, which enables a detection light 23 to pass unimpeded. The substrate 69 has a second segment 73, which is coated such that light that has a wavelength above a first illumination light wavelength (for example 488 nm) may pass, and detection light portions of the first illumination light wavelength are blocked. The substrate 69 has a third segment 75 that enables light that is above a second illumination light wavelength (e.g., 561 nm) to pass, and blocks light that is of this wavelength and below this wavelength. The substrate 69 further has a fourth segment 77 that enables light above a third illumination light wavelength of, for example, 630 nm to pass, and blocks detection light with wavelengths below the third illumination light wavelength. In this example, the detection light transmitted by the segment 71 may subsequently, for example, reach a spectrometer, whereas the second, third, and fourth segment 73, 75, 77, deflect the detection light 23 to a further detector, which may be implemented as a multiband detector, as illustrated in FIG. 4.

Figure 5:
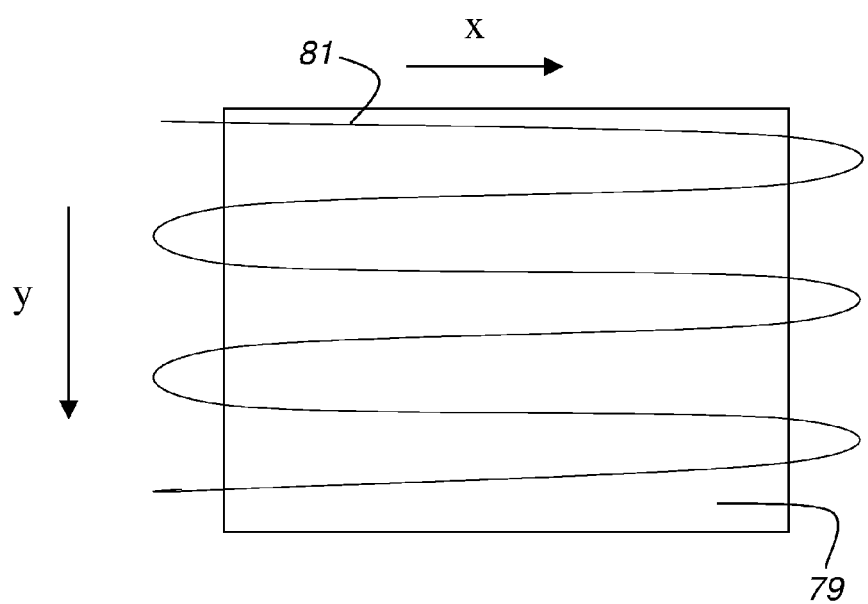
FIG. 5 the scan field of a sample to be scanned.

FIG. 5 shows a scan field 79 within a sample that is to be scanned with the focus of an illumination light beam. The focus of an illumination light beam is directed along a scan path 81. As a result of the lag of the beam deflector, the scan path does not describe an ideal meander pattern, but rather one more like a sinus curve. In this embodiment, with each sweep, that is, with each movement of the focus of the illumination light beam in the positive x direction, the resultant detection light is directed to a detector, which may, for example, be a multiband detector, whereas with each return, that is, with each movement of the focus of the illumination light beam in the negative x direction, the resultant detection light is directed to a further detector which may, for example, be a spectrometer.

In the embodiments described herein, the deflector preferably has a filter and/or a filter coating. Thus, for example, a coated substrate may be provided that is coated segmentally such that several segments reflect light of the illumination light wavelength, and others permit this light to pass. In a particular variant, the segments could ideally be arranged for sequential line scanning with illumination light of various wavelengths such that in each case one segment acts as an excitation filter (blocking light of the excitation wavelength; high transmission of the respective fluorescent light having a longer wavelength) for the illumination light wavelength that has just been switched on.

The segments may, for example, be implemented as bandpass filters.

In an embodiment, a segment is implemented as a polarization filter, in particular as a polarizing analyzer. Here, the polarizing analyzer preferably has a direction of transmission that has a 90 degrees off-set with respect to the orientation of the excitation light. A further segment also has a polarizing analyzer with a direction of transmission crossed in relation to the first polarizing analyzer. Furthermore, a third segment may have a third polarizing analyzer with a specific orientation (e.g., magic angle). This arrangement offers the possibility of measuring florescent depolarization. Here, switching is preferably accomplished line by line between the segments.

Preferably, the back surface of a mirror or filter substrate has an anti-reflex coating.

In a particularly preferred embodiment, a drive for rotating and/or swiveling the deviating device is provided. The drive may, for example, be implemented as a galvanometer or as a motor.

In a particular variant, the deflector comprises a round substrate that is segmentally coated in a pie-chart-like manner. The round substrate is mounted perpendicularly at its mid-point on a rotating shaft, which is rotated by a motor that is synchronized with the beam deflector. The substrate is struck by the detection light beam at an oblique angle (preferably 45 degrees). The imaginary extension of the rotating shaft cuts the optical axis of the detection light beam, depending on the deflecting position of the beam deflector, and in this variant the various segments are rotated by the motor in the beam path of the detection light.

In this variant, one obtains a stationary detection beam, whereas the use of a mirror that is swivelable in the beam path leads to a mobile detection light beam which may, for example, be imaged on a line detector or on a streak camera (e.g., for FLIM experiments).

In a preferred variant, the sample is scannable on a plane. Here, provision may be made such that a shift in directing the detection light to the detector or to the outcoupling port occurs synchronous with the scanning on a plane. For example, scanning of the sample for detection may first be accomplished with the detector, whereas subsequently when scanning the same plane or a further plane, detection may be accomplished with the further detector.

In a further, very particularly preferred variant, the sample is scannable line by line. Here, provision is preferably made that a shift in directing the detection light to the detector or to the outcoupling port or to the further detector occurs synchronous with the line-by-line scanning. In this variant it is, for example, possible to detect in regular sequence two successive scan lines at one time with a further detector and a third scan line with the detector. The arrangement of the substrate coating of the deflector is implemented in this variant as a two-thirds/one-third subdivision, such that the external detector is struck by detection light for the duration of the scanning of two scan lines, and the detector is struck by detection light for the duration of the scanning of the subsequent scan line in each case.

The detector can, like the further detector, also be implemented as a single detector and/or as a spectrometer and/or as a multiband detector.

In a very particularly advantageous variant, the sample may be scanned bidirectionally. Here, provision may be made for directing detection light to the detector during the sweep portion of bidirectional scanning, and to the outcoupling port or to the further detector during the return portion of bidirectional scanning.

The deviating device may also comprise a "chopper plate." This has the advantage that no optical beam displacement is elicited. Blades of the chopper plate may, for example, be mirrored (silvered). Here, the layout of slats and free segments is arbitrary. It is also conceivable that different sectors of the circle have different layouts of slats and free segments. By displacing the chopper plate parallel to the axis of rotation, different modes of operation may thus be selected.

In a particularly preferred embodiment, the scanning microscope is implemented as a confocal scanning microscope.

The invention has been described in relation to a particular embodiment. However, it is obvious that changes and variations may be implemented without abandoning the scope of the following claims.

What is claimed is:

1. A scanning microscope with a beam deflector that directs an illumination light beam over or through a sample, and with a detector for receiving detection light exiting from the sample, wherein the scanning microscope has an outcoupling port or a further detector, and wherein a deflector is provided that is synchronized with the beam deflector and directs the detection light, dependent on the deflecting position of the beam deflector, either to the detector or to the outcoupling port or to the further detector.

2. The scanning microscope according to claim 1, wherein a further detector is couplable to the outcoupling port.

3. The scanning microscope according to claim 2, wherein the further detector comprises a single detector or a spectrometer and/or a multiband detector or a line detector and/or a streak camera.

4. The scanning microscope according to claim 1, wherein the deflector is rotatable or swivelable.

5. The scanning microscope according to claim 4, wherein is provided a drive for rotating or swiveling the deflector.

6. The scanning microscope according to claim 5, wherein the drive comprises a galvanometer or a motor.

7. The scanning microscope according to claim 6 wherein the detection light cuts the axis of rotation or the axis of swivel.

8. The scanning microscope according to claim 1, wherein the deflector comprises an acousto-optical component.

9. The scanning microscope according to claim 1, wherein the deflector comprises a mirror.

10. The scanning microscope according to claim 9, wherein the mirror is implemented as a segment mirror.

11. The scanning microscope according to claim 1, wherein the deflector comprises a filter.

12. The scanning microscope according to claim 1, wherein the sample is scannable on the plane.

13. The scanning microscope according to claim 12, wherein a shift in directing the detection light to the detector or to the further detector or to the outcoupling port occurs in synchronization with scanning on a plane.

14. The scanning microscope according to claim 1, wherein the sample is scannable line by line.

15. The scanning microscope according to claim 14, wherein a shift in directing the detection light to the detector or to the further detector or to the outcoupling port occurs in synchronization with line by line scanning.

16. The scanning microscope according to claim 1, wherein the sample is bidirectionally scannable.

17. The scanning microscope according to claim 16, wherein the detection light reaches the detector during the sweep of bidirectional scanning, and the outcoupling port or the further detector during the return of bidirectional scanning.

18. The scanning microscope according to claim 16, wherein the detection light reaches the outcoupling port or the further detector during the sweep of bidirectional scanning, and the detector during the return of bidirectional scanning.

19. The scanning microscope according to claim 1, wherein the scanning microscope is a confocal scanning microscope.

* * * * *